(12) United States Patent
Umeuchi et al.

(10) Patent No.: US 8,917,642 B2
(45) Date of Patent: Dec. 23, 2014

(54) STATION, STATION CONTROL METHOD, AND STATION CONTROL PROGRAM

(75) Inventors: Makoto Umeuchi, Yokosuka (JP); Tomohiro Tokuyasu, Yokosuka (JP); Takefumi Hiraguri, Yokosuka (JP); Toshihiro Manabe, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 370 days.

(21) Appl. No.: 12/937,345

(22) PCT Filed: Dec. 18, 2008

(86) PCT No.: PCT/JP2008/073104
§ 371 (c)(1),
(2), (4) Date: Oct. 11, 2010

(87) PCT Pub. No.: WO2009/128184
PCT Pub. Date: Oct. 22, 2009

(65) Prior Publication Data
US 2011/0032857 A1    Feb. 10, 2011

(30) Foreign Application Priority Data

Apr. 18, 2008  (JP) .................................. 2008-109151

(51) Int. Cl.
| | | |
|---|---|---|
| *G08C 17/00* | (2006.01) | |
| *G06F 9/44* | (2006.01) | |
| *H04W 48/20* | (2009.01) | |
| *H04L 29/08* | (2006.01) | |

(52) U.S. Cl.
CPC ............. *H04W 48/20* (2013.01); *G06F 9/4401* (2013.01); *H04L 67/30* (2013.01)

USPC ........... 370/311; 370/310; 370/317; 370/328; 455/343.1; 455/343.6; 455/552.1

(58) Field of Classification Search
None
See application file for complete search history.

(56) References Cited

U.S. PATENT DOCUMENTS

| | | | |
|---|---|---|---|
| 2004/0114553 A1* | 6/2004 | Jiang et al. ..................... | 370/328 |
| 2006/0019679 A1* | 1/2006 | Rappaport et al. ......... | 455/456.5 |
| 2006/0069760 A1* | 3/2006 | Yeap et al. ..................... | 709/221 |

(Continued)

FOREIGN PATENT DOCUMENTS

| | | | |
|---|---|---|---|
| JP | 6-119265 | A | 4/1994 |
| JP | 2003-235075 | A | 8/2003 |
| JP | 2004-187002 | A | 7/2004 |
| JP | 2005-057464 | A | 3/2005 |

(Continued)

*Primary Examiner* — Anez Ebrahim
(74) *Attorney, Agent, or Firm* — Harness, Dickey & Pierce, P.L.C.

(57) ABSTRACT

An application to be booted is selected and operation of the application is controlled according to status of a link between an access point and a station. A station (STA) which can be connected to an access point (AP) includes a link information obtaining procedure which obtains link information including an identifier of the AP to which the STA is connected while the STA is connected to the AP and an application control procedure which selects an application to be booted according to the link information by referring to an action profile in which an identifier of the link information and an application to be booted are related and registered.

9 Claims, 8 Drawing Sheets

(56) References Cited

U.S. PATENT DOCUMENTS

| | | |
|---|---|---|
| 2007/0082660 A1 | 4/2007 | Smith et al. |
| 2007/0253359 A1* | 11/2007 | Hall et al. .................. 370/328 |
| 2007/0274244 A1* | 11/2007 | Yoon et al. .................. 370/311 |
| 2008/0002692 A1 | 1/2008 | Meylan et al. |
| 2008/0014916 A1 | 1/2008 | Chen |
| 2008/0176548 A1* | 7/2008 | Liang ......................... 455/419 |
| 2008/0181187 A1* | 7/2008 | Scott et al. .................. 370/338 |

FOREIGN PATENT DOCUMENTS

| | | |
|---|---|---|
| JP | 2007-060564 A | 3/2007 |
| TW | 200805994 A | 1/2008 |
| TW | 200818777 A | 4/2008 |
| WO | WO-2007/102479 A1 | 9/2007 |

* cited by examiner

| LINK INFORMATION | APPLICATION | | | |
|---|---|---|---|---|
| SSID OF WIRELESS LAN | AUTHENTICATION SOFTWARE | E-MAIL SOFTWARE | VoIP | IM SOFTWARE |
| PUBLIC WIRELESS LAN SERVICE | AUTHENTICATION PROCESSING | TRANSMIT AND RECEIVE MAIL | | |
| OFFICE WIRELESS LAN | | TRANSMIT AND RECEIVE MAIL | STANDBY | |
| HOME WIRELESS LAN | | TRANSMIT AND RECEIVE MAIL | | STANDBY |

Fig. 4

| LINK INFORMATION | | APPLICATION | | | |
|---|---|---|---|---|---|
| SSID OF WIRELESS LAN | COMMUNICATION ENVIRONMENT OF WIRELESS LAN | AUTHENTICATION SOFTWARE | E-MAIL SOFTWARE | VoIP | IM SOFTWARE |
| PUBLIC WIRELESS LAN SERVICE | ◯ | AUTHENTICATION PROCESSING | TRANSMIT AND RECEIVE MAIL | | |
| | △ | AUTHENTICATION PROCESSING | OBTAIN HEADER | | |
| OFFICE WIRELESS LAN | ◯ | | TRANSMIT AND RECEIVE MAIL | STANDBY | |
| | △ | | OBTAIN HEADER | STANDBY | |
| HOME WIRELESS LAN | | | TRANSMIT AND RECEIVE MAIL | | STANDBY |
| | | | | | |

Fig. 6

| LINK INFORMATION | | | APPLICATION | | |
|---|---|---|---|---|---|
| SSID OF WIRELESS LAN | COMMUNICATION ENVIRONMENT OF WIRELESS LAN | COMMUNICATION ENVIRONMENT OF CELLULAR PHONE | AUTHENTICATION SOFTWARE | E-MAIL SOFTWARE | VoIP |
| PUBLIC WIRELESS LAN SERVICE | ○ | ○ | AUTHENTICATION PROCESSING | TRANSMIT AND RECEIVE MAIL | |
| | ○ | △ | AUTHENTICATION PROCESSING | TRANSMIT AND RECEIVE MAIL | STANDBY |
| | △ | ○ | | OBTAIN HEADER | |
| | △ | △ | | | |
| OFFICE WIRELESS LAN | ○ | ○ | | TRANSMIT AND RECEIVE MAIL | |
| | ○ | △ | | TRANSMIT AND RECEIVE MAIL | STANDBY |
| | △ | ○ | | OBTAIN HEADER | |
| | △ | △ | | OBTAIN HEADER | STANDBY |

Fig. 8

| LINK INFORMATION | APPLICATION | | | | |
|---|---|---|---|---|---|
| SSID OF WIRELESS LAN | AUTHENTICATION SOFTWARE | E-MAIL SOFTWARE | VoIP | IM SOFTWARE | POWER SAVING CONTROL (SLEEP TIME) |
| PUBLIC WIRELESS LAN SERVICE | AUTHENTICATION PROCESSING | TRANSMIT AND RECEIVE MAIL | | | T1 |
| OFFICE WIRELESS LAN | | TRANSMIT AND RECEIVE MAIL | STANDBY | | T2 |
| HOME WIRELESS LAN | | TRANSMIT AND RECEIVE MAIL | | STANDBY | T3 |

Fig. 9

| LINK INFORMATION | APPLICATION | | | | |
|---|---|---|---|---|---|
| SSID OF WIRELESS LAN | AUTHENTICATION SOFTWARE | E-MAIL SOFTWARE | VoIP | IM SOFTWARE | POWER SAVING CONTROL (SLEEP TIME) |
| PUBLIC WIRELESS LAN SERVICE | AUTHENTICATION PROCESSING | TRANSMIT AND RECEIVE MAIL | | | T1 |
| OFFICE WIRELESS LAN | | TRANSMIT AND RECEIVE MAIL | STANDBY | | T2 |
| HOME WIRELESS LAN | | TRANSMIT AND RECEIVE MAIL | | STANDBY | T3 |
| CONNECTION IS UNESTABLISHED | | | | | T4 |

Fig. 10

| LINK INFORMATION | | APPLICATION | | | | POWER SAVING CONTROL (SLEEP TIME) |
|---|---|---|---|---|---|---|
| SSID OF WIRELESS LAN | COMMUNICATION ENVIRONMENT OF WIRELESS LAN | AUTHENTICATION SOFTWARE | E-MAIL SOFTWARE | VoIP | IM SOFTWARE | |
| PUBLIC WIRELESS LAN SERVICE | ○ | AUTHENTICATION PROCESSING | TRANSMIT AND RECEIVE MAIL | | | T1 |
| | △ | AUTHENTICATION PROCESSING | OBTAIN HEADER | | | |
| OFFICE WIRELESS LAN | ○ | | TRANSMIT AND RECEIVE MAIL | STANDBY | | T2 |
| | △ | | OBTAIN HEADER | STANDBY | | |
| HOME WIRELESS LAN | | | TRANSMIT AND RECEIVE MAIL | | STANDBY | T3 |
| CONNECTION IS UNESTABLISHED | | | | | | T4 |

STATION, STATION CONTROL METHOD, AND STATION CONTROL PROGRAM

CROSS-REFERENCE TO RELATED APPLICATION

This application is a U.S. National Stage application claiming the benefit of prior filed International Application Number PCT/JP2008/073104, filed on Dec. 18, 2008, in which the International Application claims priority from Japanese Patent Application Number 2008-109151, filed on Apr. 18, 2008, the entire contents of which are incorporated herein by reference.

TECHNICAL FIELD

The present invention relates to a station which selects an application to be booted and controls the operation of the application according to the status of a link between an access point and a station, a station control method, and a station control program.

BACKGROUND ART

A wireless system has the function of performing adaptable configuration of a link rate according to the status (for example, a received signal strength indication or communication quality) of a link between an access point (hereinafter referred to as an AP) and a station (hereinafter referred to as an STA). In particular, in the wireless system, such as a wireless LAN, which adopts a link adaptation method, a modulation method according to the status of a link is selected, whereby it is possible to set a corresponding link rate.

Incidentally, as for an application used under such circumstances, a previously set application is booted irrespective of link rate and is made to perform the same operation. However, sometimes changing the operation of the application according to the link rate is more efficient.

The existing wireless systems include the following systems which control the operation of an application on an STA according to the status of the link.

A first system monitors a received signal strength indication corresponding to an AP in an STA which is a mobile terminal, and boots an application performing communication with the AP when the received signal strength indication is equal to or more than a predetermined value because the distance between the AP and the STA is short and it can be expected that high-speed communication will be realized (patent document 1). Such boot control makes it possible to prevent the STA from moving to the outside of a service area before the completion of communication and prevent the link from being broken as a result of the application being booted when the STA passes through the service area of the AP, and avoid a communication failure.

A second system makes an STA determine whether transmission and reception is possible within a predetermined time according to the status of a link such as a received signal strength indication corresponding to an AP, the amount of information transmitted and received between the STA and the AP and the number of STAs associated with the AP, and boots an application performing communication with the AP (patent document 2).

Patent Document 1: Japanese Unexamined Patent Application Publication No. 2003-235075

Patent Document 2: Japanese Unexamined Patent Application Publication No. 2005-057464

DISCLOSURE

Problems to be Solved

The above-described two existing techniques make a prediction as to whether transmission and reception is possible according to the status of a link, and control a decision as to whether an application performing communication is booted or not. That is, these techniques do not select an application to be booted and control the operation of the application itself according to the wide-ranging link status including a communication environment such as type of wireless network and a received signal strength indication. On the other hand, when an authentication application is booted or e-mail software is booted automatically in a communication environment of a public wireless LAN service, for example, it is convenient if switching can be performed in such a way that only a mail header is received in an environment in which the communication quality is poor and the link rate is decreased, and the entire mail is received when the communication quality is good and high-speed communication is possible.

A proposition of the present invention is to provide an STA which can select an application to be booted and control the operation of the application according to the status of a link between an AP and the STA, an STA control method, and an STA control program.

Means for Solving the Problems

According to a first aspect, an STA which can be connected to an AP includes a link information obtaining procedure which obtains link information including identification information of the AP to which the STA is connected while the STA is connected to the AP and an application control procedure which selects an application to be booted according to the identification information of the AP to which the STA is connected by referring to an action profile in which the identification information of the AP to which the STA is connected and an application to be booted are related and registered.

Moreover, in the first aspect, the link information obtaining procedure obtains link information including the identification information of the AP to which the STA is connected and a communication environment of a link, and the application control procedure selects an application to be booted according to the identification information of the AP to which the STA is connected by referring to an action profile in which the link information, an application to be booted and operation are related and registered, and controls operation of the application according to the communication environment of the link.

Furthermore, in the first aspect, the STA can be connected to an AP of a wireless LAN network and a base station (BS) of a cellular phone network, the link information obtaining procedure obtains link information including the identification information of the AP to which the STA is connected and a communication environment of a link of each of a wireless LAN and a cellular phone, and the application control procedure selects an application to be booted according to the identification information of the AP and the BS to which the STA is connected and the communication environment of the link of each of the wireless LAN and the cellular phone by referring to an action profile in which the link information, an application to be booted and operation are related and registered, and controls operation of the application according to the communication environment of the link of each of the wireless LAN and the cellular phone.

In addition, in the first aspect, the link information obtaining procedure obtains, as the communication environment of the link, information on communication quality of a link including a received signal strength indication, a physical transmission rate, a packet error rate, delay and an interference level.

Moreover, in the first aspect, the STA includes a station control section which sets the STA in a power saving mode of reducing power consumption and restarts the STA after a lapse of a sleep time being predetermined, in which the action profile includes the sleep time which is registered after being related to the identification information of the AP to which the STA is connected, and the application control procedure sets, to the station control section, the sleep time according to the identification information of the AP to which the STA is connected, and causes the STA to transition to the power saving mode, after operation of the application is completed.

Furthermore, in the first aspect, the STA includes a station control section which sets the STA in a power saving mode of reducing power consumption and restarts the STA after a lapse of a sleep time being predetermined, in which the action profile includes the sleep time which is registered after being related to link information indicating that connection with the AP is unestablished, and, when connection with the AP is unestablished, the application control procedure sets, to the station control section, the sleep time according to the link information indicating that the connection is unestablished, and causes the STA to transition to a power saving mode.

According to a second aspect, an STA control method controlling operation of an application of an STA which can be connected to an AP includes a first step obtaining link information including identification information of the AP to which the STA is connected while the STA is connected to the AP and a second step selecting an application to be booted according to the identification information of the AP to which the STA is connected by referring to an action profile in which the identification information of the AP to which the STA is connected and an application to be booted are related and registered.

Moreover, in the second aspect, the first step obtains link information including the identification information of the AP to which the STA is connected and a communication environment of a link, and the second step selects an application to be booted according to the identification information of the AP to which the STA is connected by referring to an action profile in which the link information, an application to be booted and operation are related and registered, and controls operation of the application according to the communication environment of the link.

Furthermore, in the second aspect, the STA can be connected to an AP of a wireless LAN network and a base station of a cellular phone network, the first step obtains link information including the identification information of the AP to which the STA is connected and a communication environment of a link of each of a wireless LAN and a cellular phone, and the second step selects an application to be booted according to the identification information of the AP to which the STA is connected and the communication environment of the link of each of the wireless LAN and the cellular phone by referring to an action profile in which the link information, an application to be booted and operation are related and registered, and controls operation of the application according to the communication environment of the link of each of the wireless LAN and the cellular phone.

In addition, in the second aspect, the first step obtains, as the communication environment of the link, information on communication quality of a link including a received signal strength indication, a physical transmission rate, a packet error rate, delay and an interference level.

Moreover, in the second aspect, the STA includes a third step performing processing by which the STA is set in a power saving mode of reducing power consumption of the station and is restarted after a lapse of a sleep time being predetermined, the action profile includes the sleep time which is registered after being related to the identification information of the AP to which the STA is connected, and the second step sets the sleep time according to the identification information of the AP to which the STA is connected and transitions to the third step, after operation of the application is completed.

Furthermore, in the second aspect, the STA includes a third step performing processing by which the STA is set in a power saving mode of reducing power consumption of the station and is restarted after a lapse of a sleep time being predetermined, the action profile includes the sleep time which is registered after being related to link information indicating that connection with the AP is unestablished, and, when connection with the AP is unestablished, the second step sets the sleep time according to the link information indicating that the connection with the AP is unestablished, and transitions to the third step.

According to a third aspect, an STA control program controlling operation of an application of an STA which can be connected to an AP includes a first step obtaining link information including identification information of the AP to which the STA is connected while the STA is connected to the AP and a second step selecting an application to be booted according to the identification information of the AP to which the STA is connected by referring to an action profile in which the identification information of the AP to which the STA is connected and an application to be booted are related and registered.

Moreover, in the third aspect, the first step obtains link information including the identification information of the AP to which the STA is connected and a communication environment of a link, and the second step selects an application to be booted according to the identification information of the AP to which the STA is connected by referring to an action profile in which the link information, an application to be booted and operation are related and registered, and controls operation of the application according to the communication environment of the link.

Furthermore, in the third aspect, the STA can be connected to an AP of a wireless LAN network and a base station of a cellular phone network, the first step obtains link information including the identification information of the AP to which the STA is connected and a communication environment of a link of each of a wireless LAN and a cellular phone, and the second step selects an application to be booted according to the identification information of the AP to which the STA is connected and the communication environment of the link of each of the wireless LAN and the cellular phone by referring to an action profile in which the link information, an application to be booted, and operation are related and registered, and controls operation of the application according to the communication environment of the link of each of the wireless LAN and the cellular phone.

In addition, in the third aspect, the first step obtains, as the communication environment of the link, information on communication quality of a link including a received signal strength indication, a physical transmission rate, a packet error rate, delay and an interference level.

Moreover, in the third aspect, the STA includes a third step performing processing by which the STA is set in a power saving mode of reducing power consumption of the station and is restarted after a lapse of a sleep time being predetermined, the action profile includes the sleep time which is registered after being related to the identification information of the AP to which the STA is connected, and the second step sets the sleep time according to the identification information of the AP to which the STA is connected, and transitions to the third step, after operation of the application is completed.

Furthermore, in the third aspect, the STA includes a third step performing processing by which the STA is set in a power saving mode of reducing power consumption of the station and is restarted after a lapse of a sleep time being predetermined, the action profile includes the sleep time which is registered after being related to link information indicating that connection with the AP is unestablished, and, when connection with the AP is unestablished, the second step sets the sleep time according to the link information indicating that the connection with the AP is unestablished, and transitions to the third step.

According to the present invention, in an STA which establishes a link with an AP, an application which is booted on the STA and the operation of the application can be changed and operated adaptively according to link information including identification information of an AP to which the STA is connected and a communication environment of a link. This makes it possible to perform efficient communication.

BRIEF DESCRIPTION OF THE DRAWINGS

FIG. 4 is a diagram showing a second example of an action profile in Example 1.

FIG. 6 is a diagram showing an example of an action profile in Example 2.

FIG. 8 is a diagram showing a first example of an action profile in Example 3.

FIG. 9 is a diagram showing a second example of the action profile in Example 3.

FIG. 10 is a diagram showing a third example of the action profile in Example 3.

DETAILED DESCRIPTION OF THE EMBODIMENTS

Example 1

Figure 1:
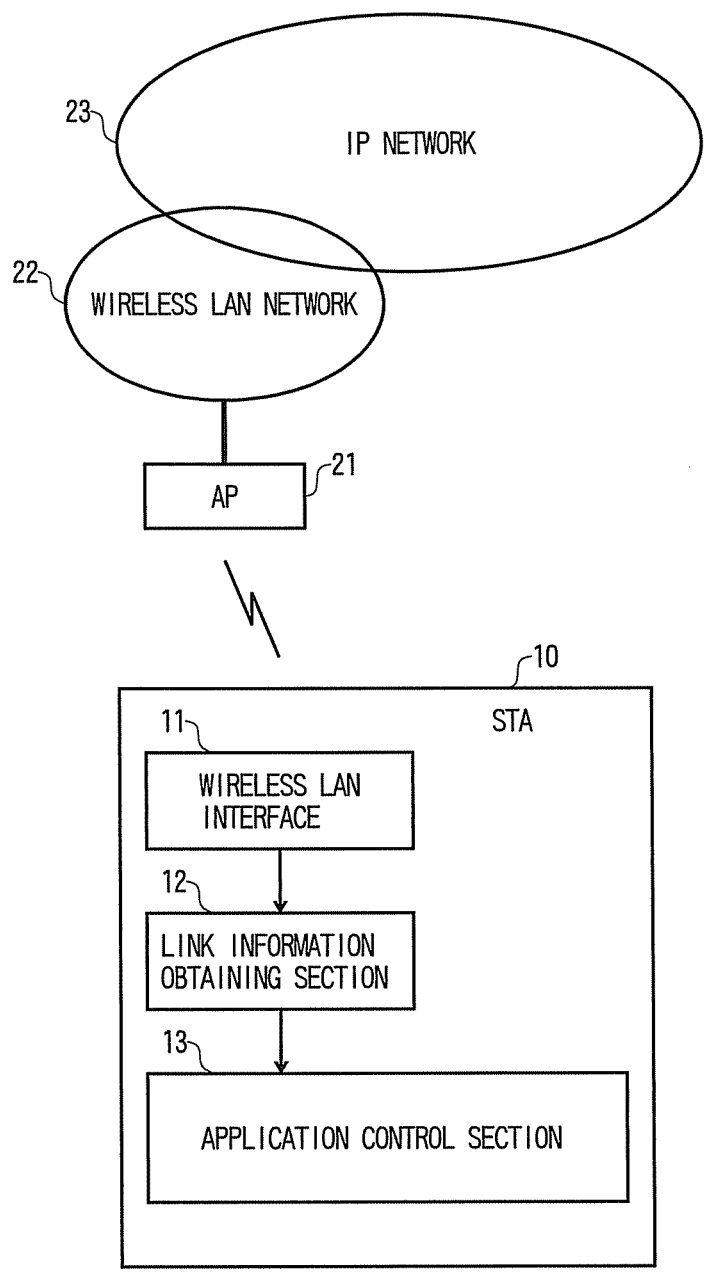
FIG. 1 is a diagram showing a configuration example of Example 1 of a wireless system including an STA of the present invention.

FIG. 1 shows a configuration example of Example 1 of a wireless system including an STA of the present invention.

In this drawing, an STA 10 is connected to a wireless LAN network 22 via an AP 21, and is connected to an IP network 23 via the wireless LAN network 22. The STA 10 includes a wireless LAN interface 11, a link information obtaining section 12, and an application control section 13.

The wireless LAN interface 11 establishes a link between the wireless LAN interface 11 and the AP 21, thereby transmitting and receiving a wireless packet, and holds link information such as identification information of the AP and a received signal strength indication. The link information obtaining section 12 obtains the link information held by the wireless LAN interface 11, and passes the link information to the application control section 13. The application control section 13 has an action profile in which link information, an application to be booted, and operation are related and registered, and a configuration file indicating an application to be booted and the operation thereof.

Figures 2, 3:
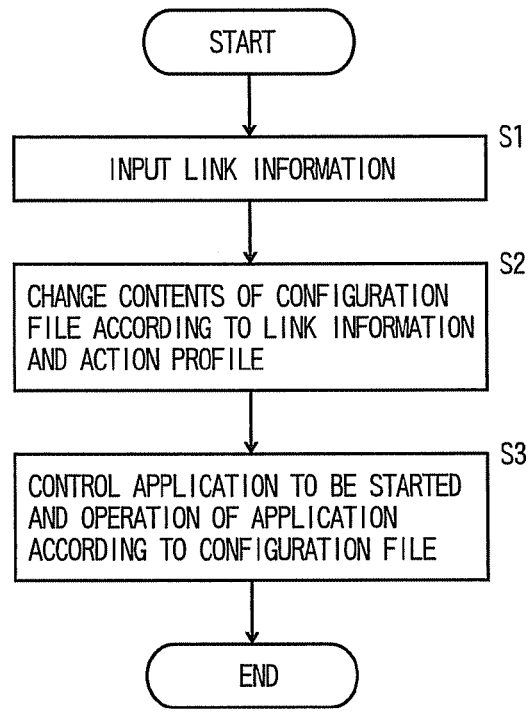
FIG. 2 is a flow chart showing a procedure of an application control section 13 of Example 1.
FIG. 3 is a diagram showing a first example of an action profile in Example 1.

FIG. 2 shows a procedure of the application control section 13 of Example 1. As shown in FIG. 2, the application control section 13 receives link information from the link information obtaining section 12 (S1), changes the contents of the configuration file according to the link information and the action profile (S2), and controls an application to be booted and the operation of the application according to the configuration file (S3). Incidentally, processing for changing the contents of the configuration file may be processing for editing the configuration file, or may be processing by which configuration files each having a pattern of the action profile are prepared and a configuration file according to the link information is selected.

As described above, in the application control section 13, the configuration file is changed dynamically according to the link information, thereby controlling an application to be booted and the operation of the application. Depending on the configuration file, the name of an executable file of the application to be booted, the option, and the argument thereof are specified. Moreover, by making an application for booting and ending various applications operate and changing the contents of a corresponding configuration file, a booting sequence and a booting interval (for example, on the second time scale) of the various applications and processing at the end thereof (for example, ending the task or making the task stay resident) may be specified.

FIG. 3 shows a first example of the action profile in Example 1. Here, a case in which the service set identifier (SSID) previously assigned to the AP 21 is used as the link information is shown. The SSID is identification information specific to the AP, the identification information contained in a beacon sent by the AP or a probe response of the AP in response to a probe request from each STA.

The action profile holds, for each SSID, a list of applications to be booted. The type of SSID is assumed to be an AP of public wireless LAN service, an AP of an office wireless LAN, and an AP of a home wireless LAN. An application to be booted is assumed to be authentication software which is used when access is made to the public wireless LAN service, voice over internet protocol (VoIP) client software establishing connection with an intra-company IP telephone of the office, e-mail software, and instant message (IM) software.

When the STA obtains the SSID as the link information, the STA determines an application to be booted according to the SSID by referring to the action profile of FIG. 3. For example, the STA decides to boot the authentication software and the e-mail software when the SSID is the AP of the public wireless LAN service, to boot the VoIP client software and the e-mail software when the SSID is the AP of the office wireless LAN, and to boot the e-mail software and the IM software when the SSID is the AP of the home wireless LAN, and changes the contents of the configuration file. Incidentally, as for the e-mail software which is booted according to the SSID of each wireless LAN, the e-mail software which has been set according to each wireless LAN is selected.

This makes it possible to select an application which is booted automatically according to an AP to which the STA is connected, and make the application perform a corresponding operation. Incidentally, the type of application shown in this example is one such example, and it is possible to perform boot control for an application according to an AP to which the STA is connected.

FIG. 4 shows a second example of the action profile in Example 1. Here, a case in which the SSID of the first example shown in FIG. 3 and communication environment information of a wireless LAN are used as the link information is shown. The communication environment information is information on the communication quality of a link, such as a received signal strength indication (for example, receive signal strength indication (RSSI)), a physical transmission rate (for example, a physical (PHY) rate), a packet error rate, delay, and the interference level.

The action profile holds, for each SSID, a list of applications to be booted, and holds, for each kind of communication environment information, the operation contents of each application. The communication environment information is assumed to be a good communication environment (a circle in the drawing) and a somewhat bad communication environment (a triangle in the drawing). For the e-mail software, the operation contents of the application are assumed to include a mail transmission and reception operation and operation for obtaining only a mail header.

When the STA obtains the SSID and the communication environment information as the link information, the STA determines an application to be booted according to the SSID and the operation contents of the application according to the communication environment information by referring to the action profile of FIG. 4. For example, the STA decides to boot the authentication software and the e-mail software when the SSID is an AP of the public wireless LAN service, to perform mail transmission and reception by the e-mail software when the communication environment is good, and to obtain only a mail header by the e-mail software when the communication environment is somewhat bad, and changes the configuration file contents. Incidentally, the authentication software is programmed to perform authentication processing irrespective of communication environment.

Moreover, when the SSID is an AP of the office wireless LAN, the STA boots the VoIP client software and the e-mail software, and decides whether to transmit and receive mail by the e-mail software or to obtain only a mail header depending on the quality of the communication environment, and changes the configuration file contents. Incidentally, the VoIP client software is programmed to perform standby processing irrespective of communication quality.

Furthermore, when the SSID is an AP of the home wireless LAN, the STA boots the e-mail software and the IM software, decides to perform mail transmission and reception and standby processing irrespective of communication environment because the communication environment of the wireless LAN is nearly constant, and changes the contents of the configuration file.

This makes it possible to select an application which is booted automatically and the operation contents thereof according to an AP to which the STA is connected and a communication environment, and make the application perform a corresponding operation. Incidentally, the type of application and the operation contents shown in this example is one such example, and it is possible to perform boot control and operation control for an application according to an AP to which the STA is connected and a communication environment.

Example 2

Figure 5:
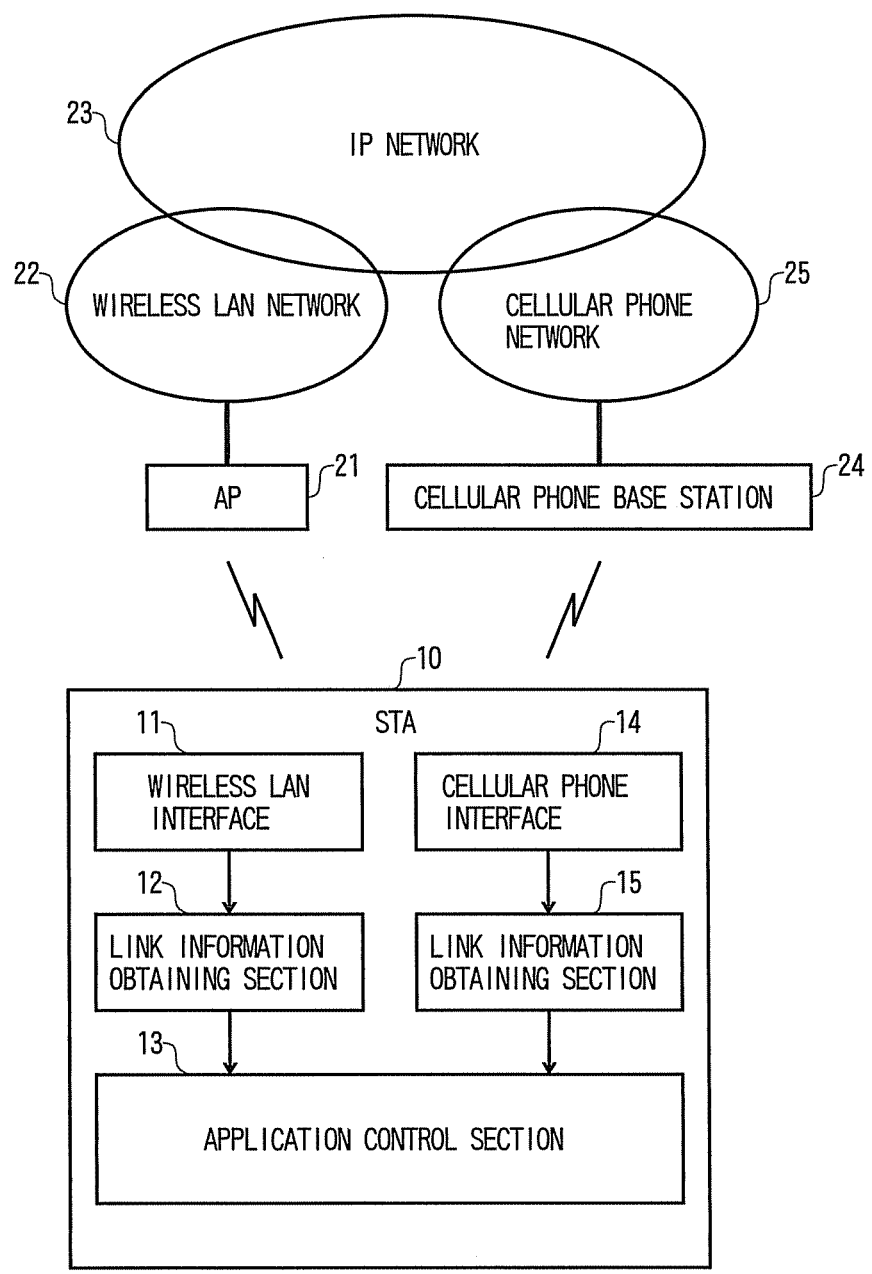
FIG. 5 is a diagram showing a configuration example of Example 2 of a wireless system including the STA of the present invention.

FIG. 5 shows a configuration example of Example 2 of a wireless system including an STA of the present invention.

In this drawing, an STA 10 is connected to a wireless LAN network 22 via an AP 21, is connected to a cellular phone network 25 via a cellular phone base station apparatus 24, and is connected to an IP network 23 via a wireless LAN network 22 and a cellular phone network 25. The STA 10 includes a wireless LAN interface 11, a link information obtaining section 12 of a wireless LAN, a cellular phone interface 14, a link information obtaining section 15 of a cellular phone, and an application control section 13. Incidentally, this embodiment assumes that the STA is connected to the APs of the wireless LAN network 22 and the cellular phone network 25; however, in place of the cellular phone network 25, for example, the wireless network may be other high-speed wireless networks such as WiMAX and a PHS.

The wireless LAN interface 11 establishes a link between the wireless LAN interface 11 and the AP 21, thereby transmitting and receiving a wireless packet, and holds link information such as AP information (SSID) and a received signal strength indication. The link information obtaining section 12 obtains the link information held by the wireless LAN interface 11, passes the link information to the application control section 13. The cellular phone interface 14 establishes a link between the cellular phone interface 14 and the cellular phone base station apparatus 24, and holds link information such as base station information and a received signal strength indication. The link information obtaining section 15 obtains the link information held by the cellular phone interface 14, and passes the link information to the application control section 13. The application control section 13 has an action profile in which link information and the type and operation of application are related and registered, and a configuration file indicating an application to be booted and the operation thereof. A procedure of the application control section 13 is the same as that of the example shown in FIG. 2.

FIG. 6 shows an example of the action profile in Example 2. Here, a case in which, in addition to the SSID and the communication environment information of the wireless LAN of the second example of Example 1 shown in FIG. 4, communication environment information of a cellular phone is used as the link information is shown. As is the case with the communication environment information of a wireless LAN, the communication environment information of a cellular phone is information on the communication quality of a link.

The action profile holds, for each SSID, a list of applications to be booted, and holds, for each kind of communication environment information of a wireless LAN and a cellular phone, the operation contents of each application. The communication environment information is assumed to be a good communication environment (a circle in the drawing) and a somewhat bad communication environment (a triangle in the drawing). For the e-mail software, the operation contents of the application are assumed to include a mail transmission and reception operation and operation for obtaining only a mail header.

When the STA obtains the SSID and the communication environment information as the link information, the STA determines an application to be booted according to the SSID and the communication environment information by referring to the action profile of FIG. 6, and determines the operation contents of the application according to the communication environment information. For example, the STA boots the authentication software and the e-mail software when the SSID is an AP of the public wireless LAN service and the communication environments of both the wireless LAN and the cellular phone are good, decides to perform mail transmission and reception by the e-mail software, and changes the contents of the configuration file. Moreover, when the SSID is an AP of the public wireless LAN service, the communication environment of the wireless LAN is good, and the communication environment of the cellular phone is somewhat bad, the STA boots the authentication software, the e-mail software, and the VoIP client software, performs mail transmission and reception by the e-mail software, decides to perform standby processing by the VoIP client software, and changes the contents of the configuration file. Incidentally, the difference between the above two cases is in whether the VoIP client software is booted or not according to the quality of the communication environment of the cellular phone. Priority is given to an IP telephone by booting the VoIP client software if the communication environment of the wireless LAN is good and the communication environment of the cellular phone is somewhat bad.

Moreover, when the SSID is an AP of the public wireless LAN service, the communication environment of the wireless LAN is somewhat bad, and the communication environment of the cellular phone is good, the STA boots only the e-mail software, decides to obtain only a mail header, and changes the configuration file contents. Furthermore, even when the SSID of the wireless LAN is not found, the above operation may be performed if the communication environment of the cellular phone is good. In addition, when the SSID is an AP of the public wireless LAN service and the communication environments of both the wireless LAN and the cellular phone are somewhat bad, the STA decides not to boot any application and changes the configuration file contents.

Moreover, when the SSID is an AP of the office wireless LAN and the communication environments of both the wireless LAN and the cellular phone are good, the STA boots the e-mail software, decides to perform mail transmission and reception, and changes the configuration file contents. Furthermore, when the SSID is an AP of the office wireless LAN, the communication environment of the wireless LAN is good, and the communication environment of the cellular phone is somewhat bad, the STA boots the e-mail software and the VoIP client software, decides to perform mail transmission and reception by the e-mail software and perform standby processing by the VoIP client software, and changes the contents of the configuration file. This difference is the same as the difference in the case in which connection with the public wireless LAN service is established.

In addition, when the SSID is an AP of the office wireless LAN, the communication environment of the wireless LAN is somewhat bad, and the communication environment of the cellular phone is good, the STA boots only the e-mail software, decides to obtain only a mail header, and changes the configuration file contents. Moreover, when the SSID of the wireless LAN is not found, the above operation may be performed if the communication environment of the cellular phone is good. Furthermore, when the SSID is an AP of the office wireless LAN and the communication environments of both the wireless LAN and the cellular phone are somewhat bad, the STA boots the e-mail software and the VoIP client software, obtains only a mail header by the e-mail software, decides to perform standby processing by the VoIP client software, and changes the contents of the configuration file. This difference in booting in the VoIP client software is the same as the difference in the case in which connection with the public wireless LAN service is established.

As a result, it is possible to select an application which is booted automatically and the operation contents thereof according to an AP to which the STA is connected and a communication environment, and make the application perform a corresponding operation. Incidentally, the type of application and the operation contents shown in this example is one such example, and it is possible to perform boot control and operation control for an application according to an AP to which the STA is connected and a communication environment.

Example 3

Figure 7:
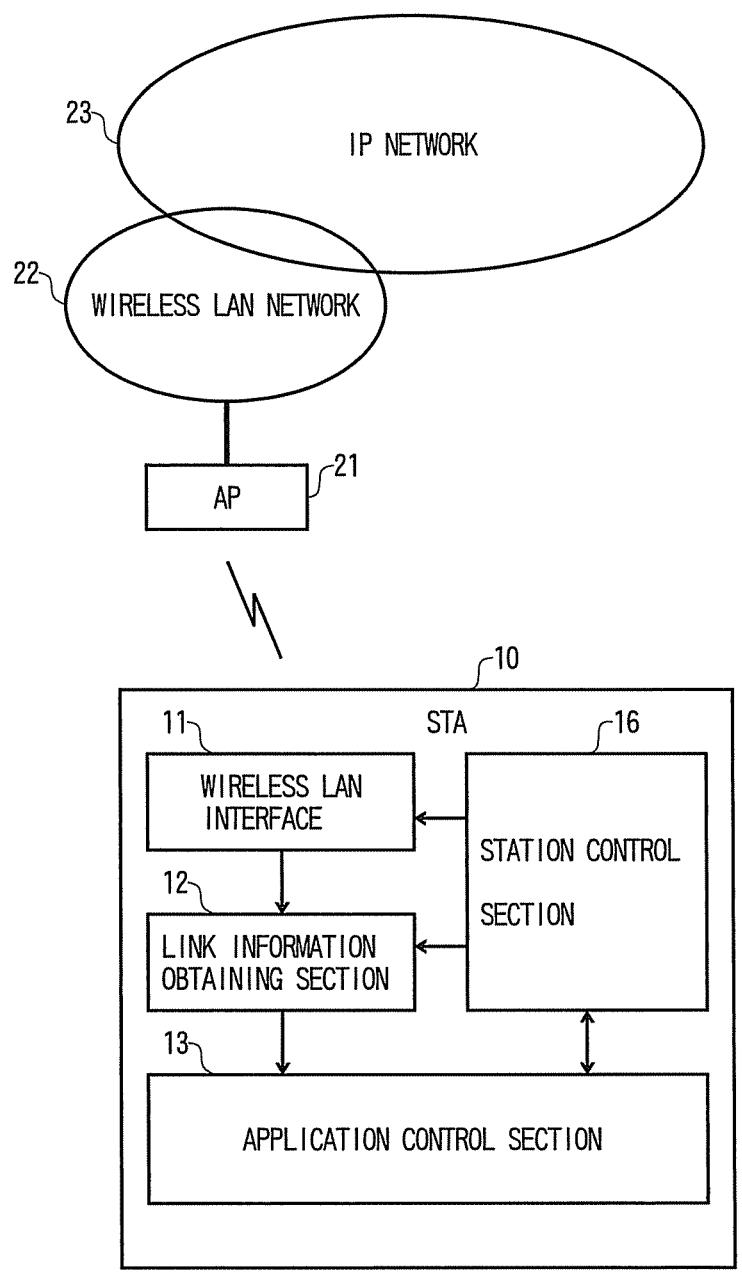
FIG. 7 is a diagram showing a configuration example of Example 3 of a wireless system including the STA of the present invention.

FIG. 7 shows a configuration example of Example 3 of a wireless system including an STA of the present invention. This example is applied to the STA of Example 1 shown in FIGS. 1 to 4; however, this example can also be applied similarly to the STA of Example 2 shown in FIGS. 5 and 6.

In FIG. 7, a station control section 16 of an STA 10 performs control for parts of the STA including the wireless LAN interface 11, the link information obtaining section 12, and the application control section 13 such that the parts are set in a power saving mode of saving power consumption and are restarted after a lapse of a predetermined sleep time. Incidentally, the power saving mode is a state in which, for example, the STA 10 only holds the information stored in a volatile memory or performs incoming call processing when the STA 10 implements the cellular phone interface as in Example 2, whereby power consumption is reduced by stopping an unnecessary process. Here, the station control section 16 and the application control section 13 are depicted as separate functions; however, the function of the station control section 16 may be implemented as one function of the application control section 13.

The application control section 13 of this example obtains the link information held by the wireless LAN interface 11 via the link information obtaining section 12, and, if the wireless LAN interface 11 does not establish a link between the wireless LAN interface 11 and the AP 21, the application control section 13 obtains "unestablished" as the link information. The application control section 13 has an action profile in which the link information including "unestablished", an application to be booted, and operation are related and registered, and a configuration file indicating an application to be booted and the operation thereof. A procedure of the application control section 13 is the same as that of Example 1 shown in FIG. 2.

FIGS. 8 to 10 show examples of the action profile in Example 3.

As is the case with the first example of the action profile in Example 1 shown in FIG. 3, the action profile shown in FIG. 8 holds, for each SSID of the wireless LAN, a list of applications to be booted, and holds sleep times T1 to T3 which are periods until a restart after the power saving mode is set after the operation of each application according to the SSID of the wireless LAN is completed. Furthermore, the action profile shown in FIG. 9 holds sleep times T1 to T4 which are periods until a restart after the power saving mode is set after the operation of each application according to the SSID of the wireless LAN is completed and when it is in an "unestablished" state.

Moreover, the action profile shown in FIG. 10 corresponds to the second example of the action profile in Example 1 shown in FIG. 4, and holds sleep times T1 to T4 which are periods until a restart after the power saving mode is set after the operation of each application according to the SSID of the wireless LAN is completed and when it is in an "unestablished" state.

When the application control section 13 of the STA obtains the SSID of an AP or "unestablished" link information, the application control section 13 determines an application to be booted corresponding to the SSID by referring to the action profile of FIG. 9, for example, determines a sleep time when an application is not booted after the operation of each application is completed or when it is in an "unestablished" state, and changes the contents of the configuration file. For example, when the SSID obtained by the application control section 13 is an AP of the public wireless LAN service, the application control section 13 boots the authentication software and the e-mail software, and, after the operation of the application is completed, sets the sleep time T1 for the station control section 16, making the transition to the power saving mode. The station control section 16 reboots the application after a lapse of the sleep time T1 thus set. Moreover, when the STA is not connected to an AP, the application control section 13 sets the sleep time T4 according to the "unestablished" link information, making the transition to the power saving mode. The station control section 16 restarts the parts of the STA after a lapse of the sleep time T4 thus set, and the application control section 13 performs processing corresponding to the link information obtained at that time.

Incidentally, the station control section 16 of this example records the values of the sleep times T1 to T4 and performs start-up management using a timer; however, the station control section 16 may perform processing by which a next start time is calculated based on the current time and restart is performed at that time.

This makes it possible to select an application which is booted automatically according to an AP to which the STA is connected and make the application perform a corresponding operation, and also makes it possible to perform sleep control after the operation is completed or when connection with an AP is not established. Incidentally, the type of application shown in this example is one such example, and it is possible to perform boot control for an application according to an AP to which the STA is connected.

Example 4

The above-described control processing of the STA 10 can be realized by hardware in the STA 10 shown in FIGS. 1, 5, and 7. In addition to that, the control processing can be configured such that each step forming the control processing is stored in a ROM or the like in advance as a program, and the program is read and executed by a CPU which is a computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A station which can be connected to an access point, comprising:
a link information obtaining procedure which obtains link information including identification information of the access point to which the station is connected and a communication quality of a link while the station is connected to the access point;
an application control procedure which selects an application to be booted and the initial operation mode of that application according to the identification information of the access point to which the station is connected by referring to an action profile in which the link information, the application to be booted and operation are related and registered, and selects operation of the application to control a communication traffic requested by the application by referring to the action profile and according to the communication quality of the link; and
a station control section which sets the station in a power saving mode of reducing power consumption of the station and restarts the station after a lapse of a sleep time being predetermined, wherein the action profile includes the sleep time which is registered after being related to the identification information of the access point to which the station is connected, and the application control procedure sets, to the station control section, the sleep time according to the identification information of the access point to which the station is connected, and causes the station to transition to a power saving mode, after operation of the application is completed;
wherein the action profile includes the sleep time which is registered after being related to link information indicating that connection with the access point is unestablished, and when connection with the access point is unestablished, the application control procedure sets, to the station control section, the sleep time according to the link information indicating that the connection is unestablished, and causes the station to transition to a power saving mode.

2. The station according to claim 1, wherein
the station can be connected to an access point of a wireless LAN network and a base station of a cellular phone network,
the link information obtaining procedure obtains link information further including the identification information of a base station to which the station is connected and a communication quality of a link for each of a wireless LAN and a cellular phone,
the action profile further relates and registers the link information and an operation, and
the application control procedure further selects an application to be booted according to the identification information of the base station to which the station is connected and the communication quality of the link for each of the wireless LAN and the cellular phone and selects operation of the application according to the communication quality of the link for each of the wireless LAN and the cellular phone.

3. The station according to claim 1, wherein
the link information obtaining procedure obtains information on communication quality of a link including a received signal strength indication, a physical transmission rate, a packet error rate, delay and an interference level.

4. A station control method controlling operation of an application of a station which can be connected to an access point, comprising:
a first step obtaining link information including identification information of the access point to which the station is connected and a communication quality of a link while the station is connected to the access point;
a second step selecting an application to be booted and the initial operation mode of that application according to the identification information of the access point to which the station is connected by referring to an action profile in which the link information, the application to be booted and operation are related and registered, and selecting operation of the application to control a communication traffic requested by the application by referring to the action profile and according to the communication quality of the link; and a third step performing processing by which the station is set in a power saving mode of reducing power consumption of the station and is restarted after a lapse of a sleep time being predetermined, the action profile includes the sleep time which is registered after being related to the identification information of the access point to which the station is connected, and the second step sets the sleep time according to the identification information of the access point to which the station is connected and transitions to the third step, after operation of the application is completed, the action profile further includes the sleep time which is registered after being related to link information indicating that connection with the access point is unestablished, and when connection with the access point is unestablished, the second step sets the sleep time according to the link information indicating that the connection with the access point is unestablished and transitions to the third step.

5. The station control method according to claim 4, wherein the station can be connected to an access point of a wireless LAN network and a base station of a cellular phone network, the first step further obtains link information including identification information of a base station to which the station is connected and a communication quality of a link for each of a wireless LAN and a cellular phone, the action profile further relates and registers the link information and an operation, and the second step further selects an application to be booted according to the identification information of the base station to which the station is connected and the communication quality of the link for each of the wireless LAN and the cellular phone and selects operation of the application according to the communication quality of the link for each of the wireless LAN and the cellular phone.

6. The station control method according to claim 4, wherein the first step obtains information on communication quality of a link including a received signal strength indication, a physical transmission rate, a packet error rate, delay and an interference level.

7. A non-transitory computer readable storage medium encoded with a station control program controlling operation of an application of a station which can be connected to an access point to perform the steps, comprising:

a first step obtaining link information including identification information of the access point to which the station is connected and a communication quality of a link while the station is connected to the access point;

a second step selecting an application to be booted and the initial operation mode of that application according to the identification information of the access point to which the station is connected by referring to an action profile in which the link information, the application to be booted and operation are related and registered, and selecting operation of the application to control a communication traffic requested by the application by referring to the action profile and according to the communication quality of the link; and a third step performing processing by which the station is set in a power saving mode of reducing power consumption of the station and is restarted after a lapse of a sleep time being predetermined, the action profile includes the sleep time which is registered after being related to the identification information of the access point to which the station is connected, and the second step sets, the sleep time according to the identification information of the access point to which the station is connected and transitions to the third step, after operation of the application is completed, the action profile further includes the sleep time which is registered after being related to link information indicating that connection with the access point is unestablished, and when connection with the access point is unestablished, the second step sets the sleep time according to the link information indicating that the connection with the access point is unestablished and transitions to the third step.

8. The non-transitory computer readable storage medium encoded with a station control program according to claim 7, wherein the station can be connected to an access point of a wireless LAN network and a base station of a cellular phone network, the first step further obtains link information including identification information of a base station to which the station is connected and a communication quality of a link for each of a wireless LAN and a cellular phone, the action profile further relates and registers the link information and an operation, and the second step further selects an application to be booted according to the identification information of the base station to which the station is connected and the communication quality of the link for each of the wireless LAN and the cellular phone and selects operation of the application according to the communication quality of the link for each of the wireless LAN and the cellular phone.

9. The non-transitory computer readable storage medium encoded with a station control program according to claim 7, wherein the first step obtains information on communication quality of a link including a received signal strength indication, a physical transmission rate, a packet error rate, delay and an interference level.

* * * * *